June 25, 1957 W. H. WILLERT 2,796,632
PLASTIC EXTRUDER WITH EVAPORATIVE COOLING SYSTEM
Filed Aug. 18, 1954 3 Sheets-Sheet 2

June 25, 1957 W. H. WILLERT 2,796,632
PLASTIC EXTRUDER WITH EVAPORATIVE COOLING SYSTEM
Filed Aug. 18, 1954 3 Sheets-Sheet 3

Inventor:
William H. Willert
By Harry A. Cook,
Attorney.

United States Patent Office 2,796,632
Patented June 25, 1957

2,796,632

PLASTIC EXTRUDER WITH EVAPORATIVE COOLING SYSTEM

William H. Willert, North Plainfield, N. J., assignor to Frank W. Egan & Company, Bound Brook, N. J., a corporation of New Jersey Application August 18, 1954, Serial No. 450,721

4 Claims. (Cl. 18—12)

This invention relates to the extrusion of plastic materials and particularly to extruding machines of the known screw type.

In machines of this general character, it has been common practice to apply heat to the extrusion cylinders in addition to the heat generated by the frictional contact of the screw with the plastic material being extruded, and also means has been provided for cooling the extrusion cylinders upon a rise in the temperature thereof above a predetermined degree. Coils for circulating steam or hot oil have been utilized for heating the extrusion cylinders and cooling fluid such as water or air have been circulated in coils or passages in the cylinder walls for cooling the extrusion cylinders. However, all of the known heating and cooling systems leave much to be desired because of their complexity, high cost, limitation to operation over a narrow temperature range, operation under high pressure of heating and cooling media, and uncertain results.

Therefore, a prime object of my invention is to provide a novel and improved extrusion cylinder of the general nature described having means for heating and cooling it wherein the cylinder shall be directly electrically heated, and the cylinder shall be cooled by the vaporizing of a liquid such as water where the temperature is below 375° F. or a liquid having a low vapor pressure, such as "Dowtherm," when the cylinder temperature is extremely high, and then condensing the vapors, with the liquid and vapors in a closed pressure-tight space.

Another object is to provide an extrusion cylinder of this character wherein there shall be a gradual change in temperature, thereby to provide rapid cooling and at the same time to avoid sudden shock to the extrusion cylinder and to eliminate the possibility of sudden freezing on the extrusion screw of the plastic material being extruded.

A further object is to provide heating and cooling apparatus for a plastic extruding cylinder wherein the control of the heating and cooling shall be automatic and such that there shall be no danger of heat being applied at the same time that the cooling is being effected, thereby insuring controlled heating and cooling at any desired operating temperature in the extruding cylinder.

A further object is to provide a cooling apparatus embodying a novel and improved condenser for the vapors wherein the vapors are condensed in a water jacketed condensing cylinder and a proper supply of cooling water to the water jacket shall be ensured even in case of generation of steam in said jacket.

Other objects are to provide such cooling apparatus that shall be completely enclosed and devoid of movable parts; to provide apparatus of the nature described which can be utilized over a wide temperature range, shall be economical to operate, shall be compact and out of the way and shall require a minimum of mechanical maintenance; and to obtain other advantages and results that will be brought out by the following description in conjunction with the accompanying drawings in which Figure 1 is a schematic fragmentary front elevational view of a portion of an extrusion cylinder having heating and cooling apparatus embodying the invention;

Figure 4 is a wiring diagram for the heating and cooling apparatus.

Figure 1:
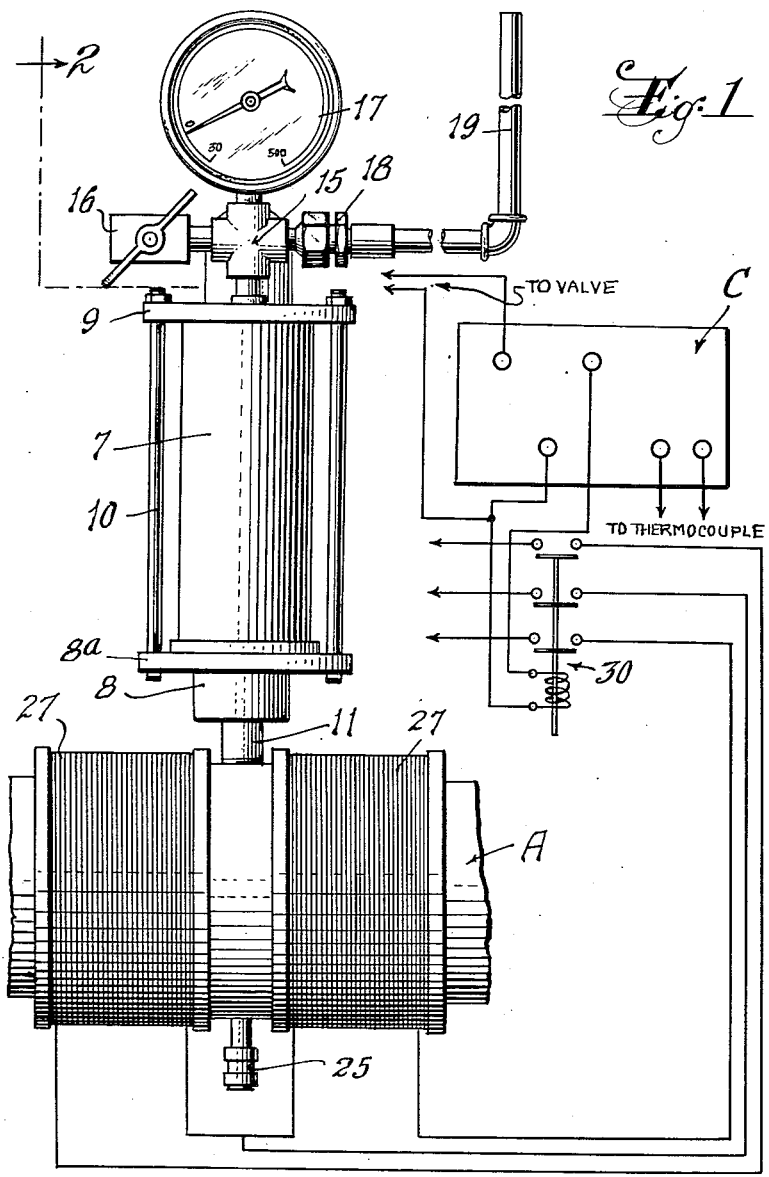
Figure 2:
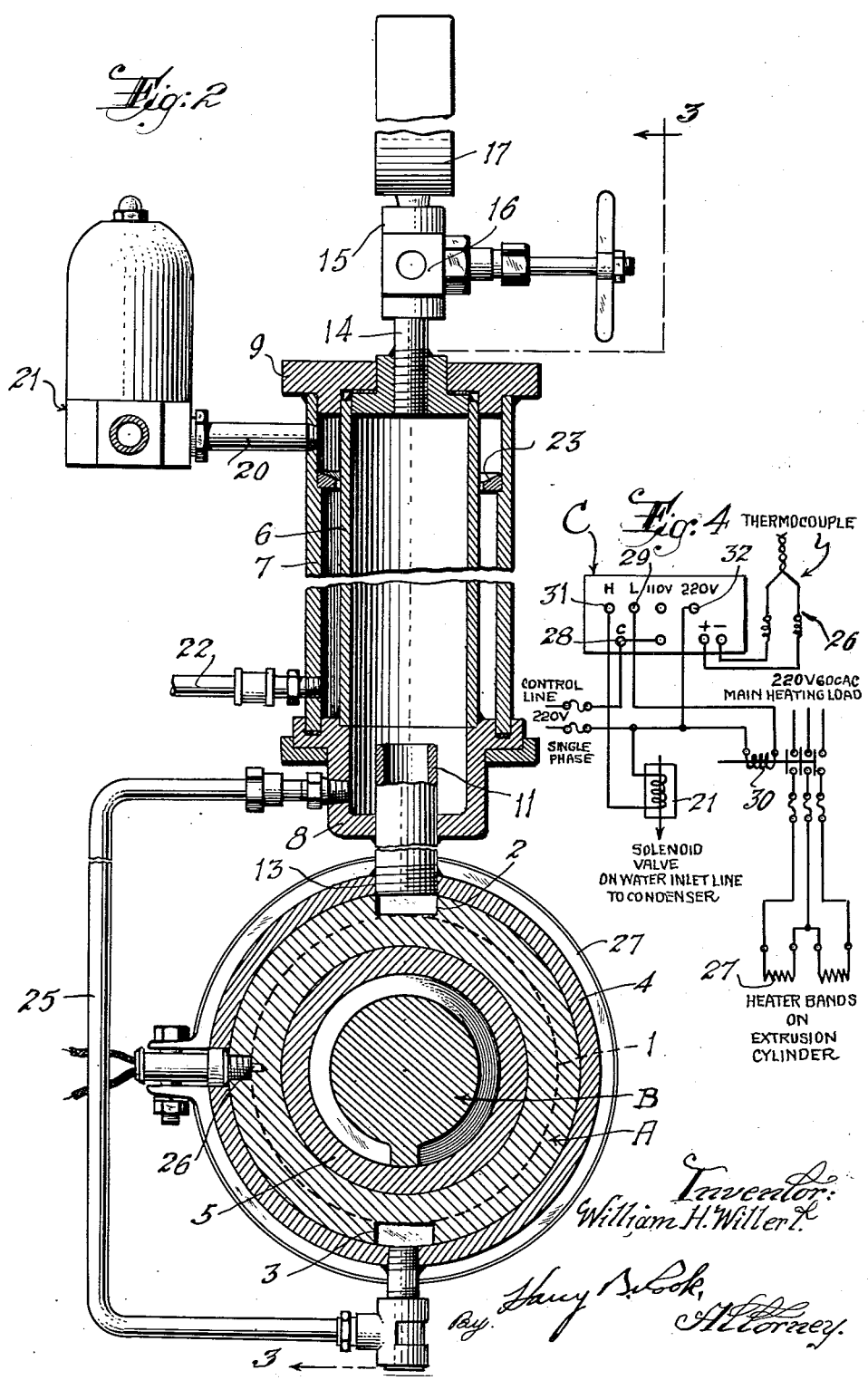
Figure 2 is an enlarged transverse vertical sectional view approximately on the plane of the line 2—2 of Figure 1.
Figure 3:
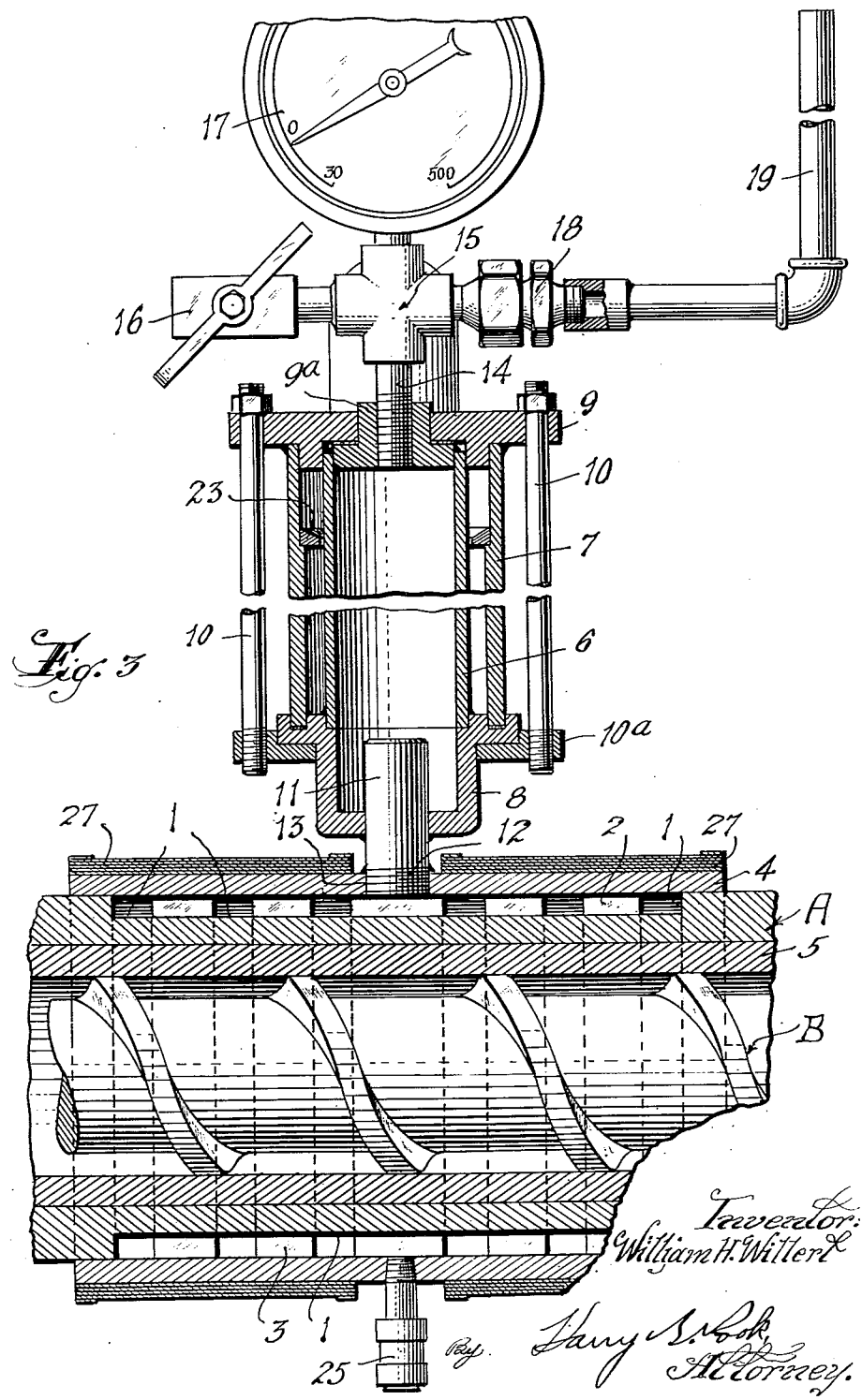
Figure 3 is a vertical longitudinal sectional view approximately on the plane of the line 3—3 of Figure 2.

Generally describing the invention, extruding machines include a body into which the material to be extruded is fed and the body has an extrusion cylinder extending from said body with an extrusion screw rotatable within the cylinder for urging the plastic material through the cylinder and out of an extrusion orifice. The cylinder comprises a plurality of zones spaced longitudinally thereof each of which is heated and cooled at temperatures that may vary depending upon the material being extruded or the speed of passage of said material through the cylinder.

For the purpose of illustrating the principles of the invention, I have shown the heating and cooling apparatus in conjunction with one zone of an extrusion cylinder A within which is the usual extrusion screw B rotated by a motor and gearing in known manner. In the outer surface of the cylinder A are cut a plurality of circumferential grooves 1 that are spaced longitudinally of the cylinder. These circumferential grooves 1 are connected at the top and bottom sides of the cylinder by longitudinal grooves 2 and 3. The depths of the grooves 1, 2 and 3, as well as the proportion of their total area to the total outer surface area of the cylinder, may vary depending upon the size of the extrusion cylinder, the wall thickness of the cylinder, the length of the zone, and other factors such as the desired rate of cooling, which will be considered later.

Shrunk on the outer surface of the cylinder A is a sleeve 4 so that the sleeve overlies the grooves 1, 2 and 3. Preferably the sleeve is welded into place so as to provide a good metal-to-metal contact between the outer diameter of the cylinder and inner diameter of the sleeve. As shown, preferably the cylinder A also has an alloy liner 5 to take the wear of the screw B and the plastic material.

Mounted on the top side of the sleeve 4 is a hollow cylinder 6 which is surrounded in spaced coaxial relation by another cylinder 7 both of which are secured by the lower and upper heads 8 and 9, respectively, that are tied together by tie bolts 10 directly connected to the head 9 and connected to a ring 8a that slips over the head 8. A nipple 11 has one end extending into the cylinder 6 and its other end secured as by screw threads 12 in an opening 13 in the sleeve 4. The bottom head 8 is cup-shaped and the inner end of the nipple 11 extends upwardly to a point substantially above the lower end of said cup-shaped head. The cylinder 6 is preferably welded to the head 8 and to a cap 9a in the head 9 to provide a pressure-tight chamber. The cap 9a has connected thereto a nipple 14 to which is connected one arm of a four-armed pipe fitting 15, to another arm of which is connected a vent valve 16. The other two arms of the fitting 15 have connected thereto a pressure gauge 17 and a safety head 18, respectively. The safety head is of the ruptured disk type and may have a riser pipe 19 connected thereto of sufficient height to carry any pressure released by the safety head to be discharged at a safe distance from the apparatus.

At the upper end of the cylinder 7 is a water inlet pipe 20 which is controlled by a solenoid valve 21, and at the lower end of the cylinder 7 is a water drain pipe 22.

Just below the water inlet pipe 20 is a baffle ring 23 in closely spaced relation to the outer surface of the cylinder 6 so as to cause water from the pipe 20 to cascade down along the wall of the cylinder 6. The cylinder 7 with the space between it and the cylinder 6 thus provides a water jacket for the cylinder 6 in which the vapors of a heat-transferring liquid, to be described, are condensed. Ordinarily said cylinder 6 would be about 2⅜ inches in diameter and about 10 inches in height between the upper and lower heads, and it constitutes a condensing chamber.

In operation of the apparatus a heat-transferring liquid of known type, for example "Dowtherm A," is placed in the chambers formed by the grooves 1, 2 and 3 until said grooves are approximately filled, i. e., with the level at about the midpoint of the depth of the upper groove 2. The heat transferring liquid is of such nature that it will vaporize at a temperature in the extrusion cylinder somewhat below the allowable maximum temperature and with a vapor pressure within practical limits. For example, water can be used with temperatures up to 375° F. at which the vapor pressure is about 200 pounds per square inch gage; while at temperatures from 300° F. to 750° F. a liquid with low vapor pressure of for example from less than 100 pounds to 150 pounds per square inch would be used. "Dowtherm A," which consists of 26.5% diphenyl and 73.5% diphenyl oxide, has been found to be satisfactory. Vapors will exist in the system at all temperatures even when the extruding cylinder is at room temperature because before operation of the apparatus is started, it is desirable to raise the temperature of the zone of the extrusion cylinder to approximately 300° F. or 400° F., with the vent valve 16 closed so that part of the heat-transferring liquid becomes vaporized. Then the valve 16 should be opened to vent all of the so-called uncondensible gases or vapors and to remove the oxygen and air from the system. The heat-transferring vapors will push these undesirable substances from the system, and after they have been expelled, said valve should be closed. At room temperature the system will be under a slight vacuum normally. During operation of the system this procedure should be repeated at more or less regular intervals to remove any products of decomposition occurring in the heat-transferring medium. While the apparatus is operating, the vapors will rise into the cylinder or condensing chamber 6 and there be condensed by the cold water flowing from the pipe 20 into the water jacket space between the cylinders 6 and 7. Thus if the temperature in the zone encircled by the sleeve 4 should exceed a predetermined temperature, say 350°, more of the heat-transferring liquid will vaporize thereby increasing the pressure in the condensing chamber, and the vapors carrying the heat will rise to the condensing chamber 6 where the heat will be transferred to the cold water in the space between the cylinders 6 and 7 and carried off through the drain pipe 22. As the cooling fluid flows in contact with the walls of the condenser chamber under control of the valve 21, condensation of the vapors continues and reduces the pressure in the condensing chamber so that further vaporization of the liquid occurs in the passages 1, 2 and 3, the vapors are condensed in the condensing chamber and the heat is carried off in the cooling fluid. The condensed vapors will fall to the bottom of the condenser chamber and flow by gravity through the bypass pipe 25 to the groove 3 at the bottom side of the extrusion cylinder A, where the operation will be repeated so long as the temperature in said zone of the extrusion cylinder remains at or above the predetermined optimum temperature, the conduit grooves 1, 2 and 3 and the condensing chamber 6 providing a closed space for circulation of said liquid and vapors.

If any steam should be generated in the water jacket during the operation of the apparatus, such steam will force the water through the drain 22 and at the same time ensure free flow of cold water into the jacket from the pipe 20. The water jacket is also self-drained so that when the water inlet valve 21 is closed due to the decrease in the temperature to the pre-determined degree, the water remaining in the jacket will run off through the drain pipe 22 and thereby stop the cooling action.

Another feature of the invention is the heating and automatic control of the heating and cooling cycles of the system. As shown, a thermocouple 26 is mounted in the extrusion cylinder with its heat sensitive portion disposed in a recess between the heater bands 27, and this thermocouple is connected in an electric circuit with a 3-position controller C. The zone of the extrusion cylinder included under the sleeve 3 is directly electrically heated by electric heater bands 27 of known construction that are also connected in said electric circuit with the controller C. This controller may be defined as having a low zone for one operation, which in this particular case would be heating, a neutral zone in which there is no control for heating or cooling and a high zone, which in this instance would be for cooling. The low zone is of the proportioning type in order to obtain the most satisfactory conditions. A controller of this nature is manufactured by West Instrument Company of Chicago, Illinois and is designated their model JT or JPT. As shown in the wiring diagram in Figure 4, one line wire is connected to a terminal 28 of the controller which has another terminal 29 also connected to said line wire, and said line wire is connected to one terminal of an electromagnetic switch 30, the other terminal of which is connected to the other line wire. Said electromagnetic switch controls the circuit through the heater bands 27. One terminal of the solenoid valve 21 is connected to the second-mentioned line wire, while the other terminal of the solenoid valve is connected to another terminal 31 of the controller. The second-mentioned line wire is also connected to a third terminal 32 of the controller. With this construction for energizing the heater bands 27, the electromagnetic switch 30 is energized in known manner under the influence of the temperature sensing device, i. e., the thermocouple 26, which is located on the extrusion cylinder between the heater bands, and when the temperature reaches a predetermined maximum, the solenoid valve is energized to admit water from the pipe 20 into the water jacket for cooling the vapors of the heat-transferring liquid. When the temperature is optimum, the controller neutralizes both the heating and cooling apparatus, it being understood that the controller C would be set for the desired or optimum temperature. The range of the neutral temperature zone is usually about one percent of the total scale range or about 10° F.

It will be seen that the liquid returning from the condenser through the pipe 25 to the grooves 1, 2 and 3 in the extrusion cylinder will be approximately the same temperature as the vapors entering the condenser through the nipple 11, and consequently the cooling process will be gradual and will not cause any shock to the system.

Another characteristic of the invention which is not possessed by any of the prior art cooling systems for extrusion cylinders is that if localized heating occurs at one area in the zone of the extrusion cylinder the heating and cooling of which is under control, the heat-transferring liquid adjacent that localized area will begin to boil because the temperature of the metal in that area will be raised above that of the remainder of the zone. Thus, heat will be removed from that area until the temperature of the area has dropped to that of the remainder of the zone.

This invention thus provides a temperature controlling system for an extrusion cylinder, comprising a controlled heating and cooling apparatus including a heat transferring liquid enclosed in a pressure tight space a portion of which is in the walls of the extruding cylinder and another portion of which comprises a condensing chamber so that the system may operate under a wide range of temperatures and the cooling apparatus will not operate unless the cylinder temperature rises above a predetermined temperature within said range because at any temperature below that predetermined temperature, a condition of saturated vapor and liquid equilibrium will exist in the pressure-tight space and this equilibrium will be upset only when the predetermined temperature is exceeded and the cooling fluid is automatically turned on.

While the thermocouple has been described as the temperature controller, it is conceivable that the temperature could be controlled by the vapor pressure.

Also if desired, a hand valve could be substituted for the solenoid valve 21 so that the degree of cooling could be controlled over a wide range of conditions.

I have shown the now preferred embodiment of the invention in order to explain the principles of the invention, but it should be understood by those skilled in the art that the invention may be embodied in other structural details and the apparatus may be widely modified and changed within the spirit and scope of the invention.

What I claim is:

1. The combination of a horizontal extrusion cylinder and a rotatable means therein to force heat-softenable material through the cylinder wherein frictional heat is generated, and means for controlling the temperature of a zone of the wall of said cylinder including a conduit encircling and extending longitudinally of said zone of said wall for maintaining in direct heat conducting contact with said wall a heat-transferring liquid which will vaporize at temperatures within a predetermined range produced in said conduit by the heat within the cylinder, a condenser including a condensing chamber connected to said conduit for passage of vapors from said conduit into said chamber and for passage of the liquid condensate of said vapors from said chamber to said conduit, said conduit and said condensing chamber providing a closed pressure-tight space for said liquid and said vapors, said condensing chamber having heat conducting walls, apparatus for controlling flow of cooling fluid over the exterior surface of said walls of said condensing chamber comprising a control member and means including a device in said zone of the cylinder responsive to a predetermined range of temperatures and associated with said control member to start flow of said cooling fluid over the condenser walls when the temperature in said cylinder zone exceeds a predetermined range and stop said flow of cooling fluid when the temperature of said cylinder zone lies within said predetermined range.

2. The combination as defined in claim 1 wherein said control member is electrically operated, with the addition of an electrical heater encircling said zone of said cylinder wall and wherein the last-named means includes an electrical responsive device, and an electrical controller connected in circuit with said control member and said electrical heater and said responsive device.

3. The combination as defined in claim 1 with the addition of a heater encircling said cylinder zone and wherein the last named means is associated with both said heater and said control member to start operation of said heater and stop flow of cooling fluid over said condenser walls when the temperature of said cylinder zone lies within a predetermined range, and to stop operation of said heater and start flow of said cooling fluid when the temperature in said cylinder zone exceeds said predetermined range.

4. The combination as defined in claim 1 wherein the connection between the condensing chamber and conduit includes an inlet nipple connected to said conduit at the upper side of said cylinder and extending into said chamber with its upper end at a point above the bottom wall thereof to conduct vapors of said heat-transferring liquid into said chamber, and an outlet pipe connecting the lower end of said condensing chamber below the upper end of said inlet nipple to the said conduit at the lower side of said cylinder for returning the condensate of said vapors to said conduit.

References Cited in the file of this patent

UNITED STATES PATENTS

| | | |
|---|---|---|
| 1,494,134 | Ritterrath | May 13, 1924 |
| 2,083,611 | Marshall | June 15, 1937 |
| 2,433,936 | Tornberg | Jan. 6, 1948 |
| 2,508,988 | Bradley | May 23, 1950 |
| 2,600,842 | Buecken | June 17, 1952 |